D. W. MARMON.
TROUGHS FOR FEED-WATER HEATERS.

No. 180,249. Patented July 25, 1876

Attest
Jacob W. Rowlett
Nelson A. Hunt

Inventor:
Daniel W. Marmon
By J. B. Hunt & Co.
Attys

UNITED STATES PATENT OFFICE.

DANIEL W. MARMON, OF RICHMOND, INDIANA.

IMPROVEMENT IN TROUGHS FOR FEED-WATER HEATERS.

Specification forming part of Letters Patent No. 180,249, dated July 25, 1876; application filed October 11, 1875.

*To all whom it may concern:*

Be it known that I, DANIEL W. MARMON, of Richmond, county of Wayne, and State of Indiana, have invented certain Improvements in Troughs for Feed-Water Heaters, of which the following is a specification:

This invention relates to an improved trough for feed - water heaters, said trough being made in S form instead of a regular circle, as heretofore made, the water passing in a serpentine form as it gradually descends from its ingress to its egress. In forming a complete heater one trough is laid upon another, and the different troughs are held level and in proper position by means of lugs of varying and suitable lengths, to keep the troughs level, one trough being placed above another from top to bottom of the heater, or for any desired distance within the heater, as hereinafter described.

Figure 1:
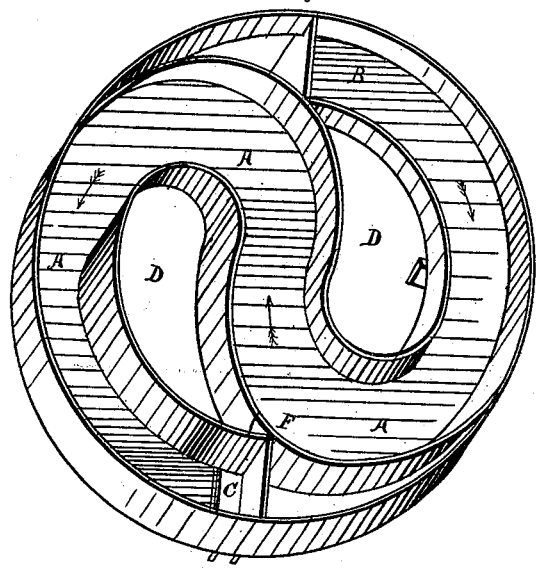
Figure 2:
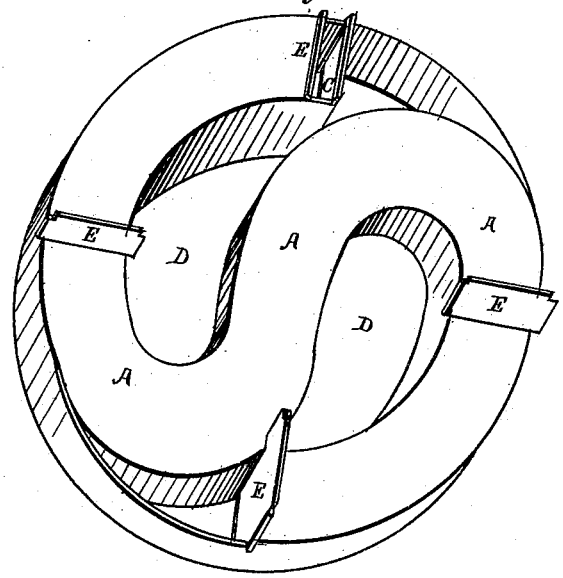

Figure 1 is a perspective top view of the trough. Fig. 2 is a perspective bottom view of the same.

A is the S-shaped trough. B is the upper end or ingress of the water. C is the lower end or egress of the same. D D are openings on either side of the trough, formed by the serpentine shape of the same. E E are lugs of varying widths, according to the descent of the trough, for the purpose of holding the troughs level when laid up within the shell of the heater, so as to form one continuous serpentine trough. The spaces D form ample passage-ways for the steam to entirely envelop the trough. The serpentine trough has a tendency to check the flow of the water as it strikes the more acute angle at F, and is thereby somewhat retarded on its way, while the serpentine shape also reverses the flow at each time the water leaves one trough, and strikes the one below it. Suppose the water, as it first strikes the upper trough at B, flows to the right; when it strikes the trough below, it reverses and flows to the left. Thus the water flows in all directions, and is continually reversing, and by this means slightly retarded, and held thereby in contact with the steam for a greater length of time.

Having thus fully described my invention, what I claim, and desire to secure by Letters Patent, is—

The within-described trough, having a serpentine water-way outlet, C, and brackets E, as shown and described, for the purpose specified.

DANIEL W. MARMON.

Witnesses:
A. H. NORDYKE,
FRANK HUNT.